US008502699B2

(12) United States Patent
Zerwekh et al.

(10) Patent No.: US 8,502,699 B2
(45) Date of Patent: Aug. 6, 2013

(54) INTEGRATED DETECTION AND MONITORING SYSTEM

(75) Inventors: William D. Zerwekh, Kalispell, MT (US); Ted R. Martinez, Albuquerque, NM (US)

(73) Assignee: MCT Technology, LLC, Albuquerque, NM (US)

( * ) Notice: Subject to any disclaimer, the term of this patent is extended or adjusted under 35 U.S.C. 154(b) by 1323 days.

(21) Appl. No.: 11/038,665

(22) Filed: Jan. 19, 2005

(65) Prior Publication Data

US 2005/0156734 A1 Jul. 21, 2005

Related U.S. Application Data

(63) Continuation-in-part of application No. 10/757,816, filed on Jan. 13, 2004, now abandoned, which is a continuation of application No. 10/465,768, filed on Jun. 18, 2003, now Pat. No. 6,708,140, which is a continuation of application No. 10/075,856, filed on Feb. 12, 2002, now Pat. No. 6,601,022.

(60) Provisional application No. 60/326,172, filed on Sep. 28, 2001.

(51) Int. Cl.
*G08G 1/01* (2006.01)

(52) U.S. Cl.
USPC .......................................... 340/933; 340/562

(58) Field of Classification Search
USPC ............ 340/933, 562, 539.26, 539.29, 539.1, 340/511, 360.1, 35; 250/360.1, 35
See application file for complete search history.

(56) References Cited

U.S. PATENT DOCUMENTS

| | | | |
|---|---|---|---|
| 4,019,053 A | 4/1977 | Levine | |
| 4,864,142 A | 9/1989 | Gomberg | |
| 5,008,661 A | 4/1991 | Raj | |
| 5,019,804 A * | 5/1991 | Fraden | 340/562 |
| 5,065,418 A * | 11/1991 | Bermbach et al. | 378/57 |
| 5,098,640 A | 3/1992 | Gozani et al. | |
| 5,210,702 A | 5/1993 | Bishop et al. | |
| 5,498,872 A | 3/1996 | Stedman et al. | |
| 5,524,133 A | 6/1996 | Neale et al. | |
| 5,591,975 A | 1/1997 | Jack et al. | |
| 5,600,303 A | 2/1997 | Husseiny et al. | |
| 5,679,956 A | 10/1997 | Johnston | |
| 5,719,396 A | 2/1998 | Jack et al. | |

(Continued)

OTHER PUBLICATIONS

"Automated Contamination Monitors", Thermo Eberline Vanguard Security Systems, http://www.eberlineinst.com/instrume/vanguard, Sep. 12, 2001.

(Continued)

*Primary Examiner* — Shirley Lu
(74) *Attorney, Agent, or Firm* — Convergent Law Group LLP

(57) ABSTRACT

A method and system is provided for implementing an integrated detection and monitoring system. Aspects of the present invention include mounting at least detector into a vehicle to provide a mobile detector. The mobile detector is then transported to a security checkpoint and positioned along side a vehicle pass-through. As a vehicle passes through, the mobile detector scans the vehicles to detect levels of one or more designated materials. If any material detected exceeds a threshold alarm level, the detected level of the material is stored in a file that is associated with the vehicle, and the file is wirelessly transmitted to a command center to notify authorities.

26 Claims, 7 Drawing Sheets

U.S. PATENT DOCUMENTS

| | | | |
|---|---|---|---|
| 5,726,450 | A | 3/1998 | Peterson et al. |
| 5,828,334 | A | 10/1998 | Deegan |
| 5,877,862 | A | 3/1999 | Nelson et al. |
| 6,043,867 | A | 3/2000 | Saban |
| 6,061,695 | A | 5/2000 | Slivka et al. |
| 6,216,540 | B1 | 4/2001 | Nelson et al. |
| 2002/0054210 | A1* | 5/2002 | Glier et al. .................... 348/149 |
| 2004/0017887 | A1* | 1/2004 | Le et al. .......................... 378/57 |
| 2004/0227630 | A1* | 11/2004 | Shannon et al. ......... 340/539.22 |
| 2004/0256565 | A1* | 12/2004 | Adams et al. .............. 250/358.1 |
| 2006/0081782 | A1* | 4/2006 | Guillebaud et al. ....... 250/360.1 |

OTHER PUBLICATIONS

"Truck/Rail Detection Systems", Rad Comm Systems, http://www.radcommsystems.com/truck.html, Sep. 14, 2001.

* cited by examiner

INTEGRATED DETECTION AND MONITORING SYSTEM

CROSS-REFERENCE TO RELATED APPLICATION

This application is a continuation-in-part of patent application Ser. No. 10/757,816, filed Jan. 13, 2004, now abandoned, which is a continuation of U.S. Pat. No. 6,708,140, filed Jun. 18, 2003, which is a continuation of U.S. Pat. No. 6,601,022, filed Feb. 12, 2002, which claims benefit of priority of provisional Patent Application Ser. No. 60/326,172, filed Sep. 28, 2001, which are all assigned to the assignee of the present application, and all incorporated herein by reference.

FIELD OF THE INVENTION

The present invention relates to vehicle detection systems, and more particularly to a method and system for implementing an integrated detection and monitoring system.

BACKGROUND OF THE INVENTION

Vehicle and rail radiation detection systems that detect the presence of radioactive materials in vehicles containing scrap metals or waste materials are known. The systems are typically installed at metal recycling centers or waste dumps to monitor vehicles entering the site to ensure that no material being dumped emits radiation above a certain level. Examples of such systems include the Vehicle and Rail Radiation Detection System by Rad/Comm Systems of Valparaiso, Ind., and the Vanguard System by Thermo Electric Corp. of Santa Fe, N. Mex.

These systems typically include a microprocessor controller and large detector assemblies mounted on each side of a vehicle pass-through, such as a road or railroad track. In operation, a truck or rail car passes the detectors and the data collected by the detectors is transferred to the controller. If the detected radiation levels exceed a certain threshold, the controller emits an alarm to alert an operator. In the Vanguard system, the detected radiation levels collected by the detectors are continually printed as a graph on a paper tape for viewing by the operator.

Although such systems effectively inform an operator of radioactive loads, the systems have disadvantages. One problem is that there is no association between the plotted radiation levels and the vehicles passing-through the system. That is, the operator has no way of knowing which radiation levels on the graph belong to which truck.

Another problem is that once a vehicle sets off the alarm and the vehicle leaves the site, there is no way to monitor the whereabouts of the vehicle. Finally, little or no thought is given to how the information about the vehicle should be used or communicated to proper authorities.

Although current detection systems protect against the dumping of noncompliant materials such as radioactive waste, these systems fail to protect against illegal and noncompliant interstate transportation of such materials. In addition, the systems fail to act as an anti-terrorism solution that can easily be deployed to a variety of security checkpoints, such as at the entrance to facilities and important events to check for car bombs and other types of contraband. The present invention addresses such needs.

SUMMARY OF THE INVENTION

One aspect of the present invention provides (Original) A method and system for implementing an integrated detection and monitoring system. This aspect of the present invention includes mounting at least one detector into a vehicle to provide a mobile detector. The mobile detector is then transported to a security checkpoint and positioned along side a vehicle pass-through. As a vehicle passes through, the mobile detector scans the vehicles to detect levels of one or more designated materials. If any material detected exceeds a threshold alarm level, the detected level of the material is stored in a file that is associated with the vehicle, and the file is wirelessly transmitted to a command center to notify authorities.

According to the method and system disclosed herein, the present invention associates the detector data with the appropriate vehicles and allows the proper authorities to be notified of vehicles transporting noncompliant and/or illegal payloads across state and national borders and security checkpoints with minimal manpower.

DETAILED DESCRIPTION OF THE INVENTION

Figure 1:
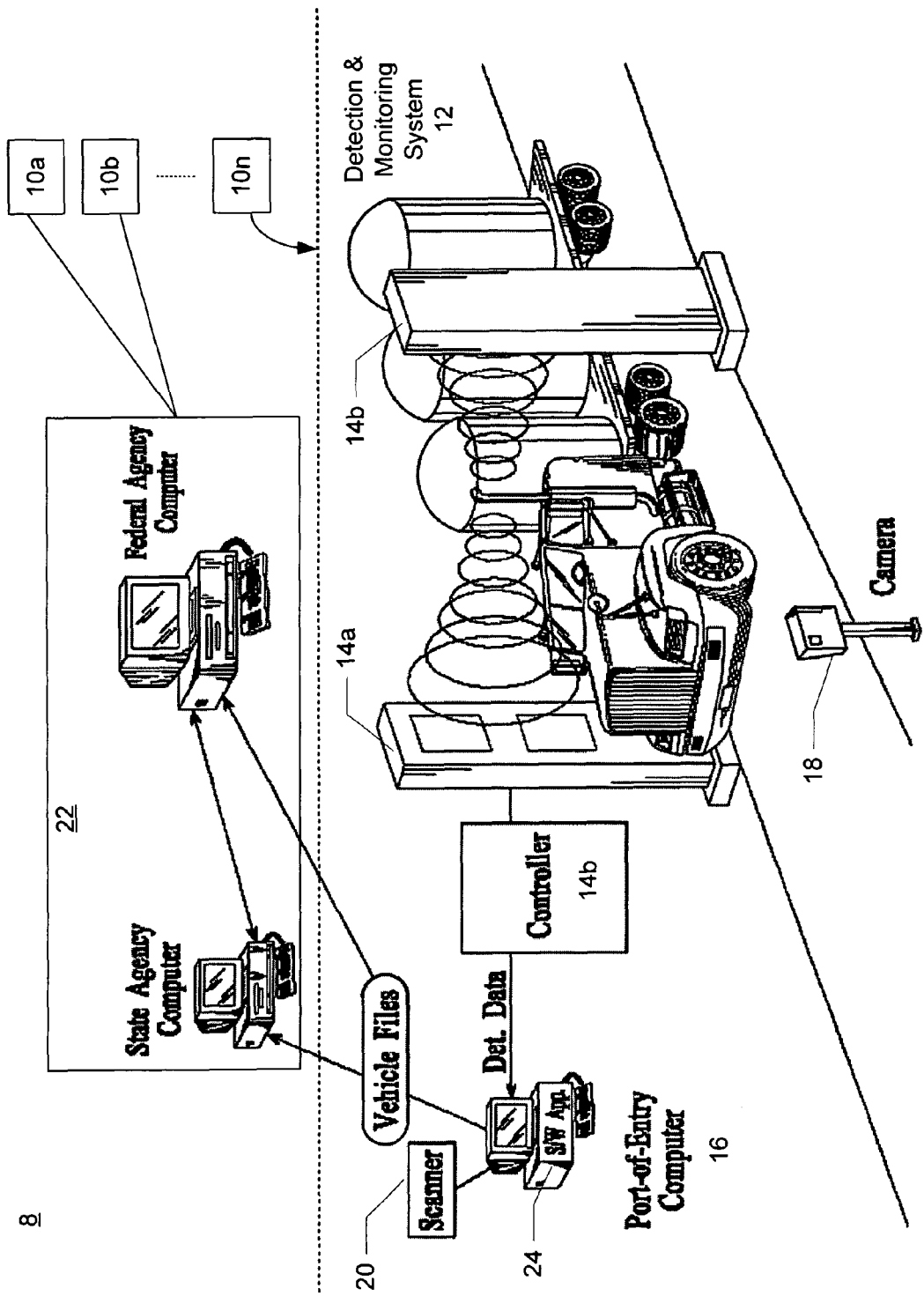
FIG. 1 is a diagram illustrating a port-of-entry detection and monitoring network in accordance with a preferred embodiment of the present invention.

The present invention relates to the detection and monitoring of noncompliant or illegal transportation of materials. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Due to the increased use of nuclear energy and the disarmament of nuclear weapons, the interstate transportation of nuclear waste for disposal is proliferating. The applicants of the present application have recognized that the rising amounts of nuclear materials on interstate highways and other forms of transportation provide greater opportunity for the materials falling into the hands of terrorists, and increases the risk of abuses by transporters who are anxious to cut costs.

Current means for detecting such noncompliant transportation across state and national borders are inadequate. On interstate highways, trucks passing state borders pass-through a port-of-entry in which the trucks are sometimes measured for radioactivity by an operator performing a handheld scan of the truck. This method not only requires human intervention, but is also error prone. First, not all port-of-entries may be equipped with hand-held scanners. And for the ones that are, only suspicious trucks are typically checked, leaving the potential for many noncompliant trucks to pass-through undetected. In addition, states do not have the manpower to check the thousands of trucks traversing the nation's ports-of-entries nor the training resources necessary to train more operators. Therefore, there is a long felt but unsolved need to protect the public from illegal and noncompliant interstate transportation of materials, such as radioactive waste. In addition, there is a need to detect other types of contraband materials, such as dirty bombs, drugs, and biological and chemical agents, etc.

The present invention addresses this need by providing a transportation detection and monitoring network. In a first aspect of the present invention, state and national ports-of-entry are equipped with vehicle radiation detection systems that measure and save the detected radiation levels of each vehicle in an electronic file, and associate the file with the respective vehicle. Each port-of-entry detection system then transmits the vehicle radiation files to a central database for governmental monitoring and review. According to the present invention, the port-of-entry detection systems allow the proper governmental agency to be notified of vehicles transporting noncompliant and/or illegal payloads across state and national borders with minimal manpower.

In a second aspect of the present invention, an Integrated Detection and Monitoring System (IDMS) is provided that is both mobile and covert. In this application of the IDMS, one or more vehicles, such as a trailer, is used to conceal and transport a corresponding detector to desired security checkpoints. Once positioned along side of a vehicle pass through at a security checkpoint, the mobile detector is used to detect noncompliant materials within vehicles that pass by. The detected levels of materials may then be wirelessly transmitted to the computer/server of the appropriate agency or command center for review and monitoring. Multiple IDMSs may report results back to the computer/server to provide an effective networked system capable of tracking the progress of each vehicle throughout the monitored area.

The first aspect of the present invention may be deployed to overtly monitor interstate ports-of-entry and international ports-of-entry, while the second aspect of the present invention may be deployed at any designated security checkpoint to covertly or overtly monitor high threat targets and minor interstate roadways with mobile systems.

Referring now to FIG. 1, a port-of-entry detection and monitoring network is shown in accordance with a preferred embodiment of the present invention. According to the present invention, the port-of-entry detection and monitoring network 8 comprises multiple state and/or national ports of entry 10, which each are equipped with a detection and monitoring system 12 that are in communication with one or more central government agency computers 22. In an alternative embodiment, the ports-of-entry may be networked to a commercial entity computer, such as a private security firm.

Each detection and monitoring system 12 at the ports-of-entry 10 include a detector system 14, which includes detector assemblies 14a mounted on each side of a vehicle pass-through and a controller 14b. In a preferred embodiment, the detector assemblies 14a detect radiation levels. Those of ordinary skill in the art, however, will readily understand that the present invention may be used with other types of detectors that detect the levels other materials, such as drugs, bombs, chemicals, and biological substances, for example.

The detector assemblies 14a may be either passive or active interrogation systems. As stated above, examples of such systems include radiation detection systems produced by RadComm and Thermo Electron Corp. An example of an active interrogation system is a pulsed deuterium-tritium neutron generator. Such a generator may provide outputs up to $10^{12}$ n/s in pulse lengths ranging between 100 ns and 20 microseconds with a lifetime greater than 1000 hours. The portability and high output of this generator makes it an ideal source for detecting highly enriched uranium and other special nuclear materials. Chemical weapon, explosive, and traditional contraband detection capabilities may also be provided.

According to the present invention, a computer 16 is connected between the detector system 14 and the government agency computer 22. A digital camera 18 and a scanner 20 are connected to the computer 16. According to the present invention, the computer 16 is connected to the controller 14b and runs a software application 24 that extracts the stream of detector data from the controller 14b, and saves the data in a file for each vehicle. The computer 16 then reports the detected radiation levels of each vehicle to the central government agency computer 22, which may comprise a local, state or federal agency (e.g., the Department of Homeland Security, or the Environmental Protection Agency), or both as shown. According to another aspect of the present invention, the detection and monitoring network 8 may be used within a single state to create a state network, used within a group of states to create a regional network, or used across the nation to create a federal network.

In a preferred embodiment where the detection and monitoring system 12 is deployed at ports-of-entry along highways that require semi trucks to stop at weigh scales, any semi trucks would be required to drive between the detector assemblies 14a before proceeding to the weigh scales. Thus, the detection and monitoring system 12 would have no additional time delay placed on commerce.

Figure 2:
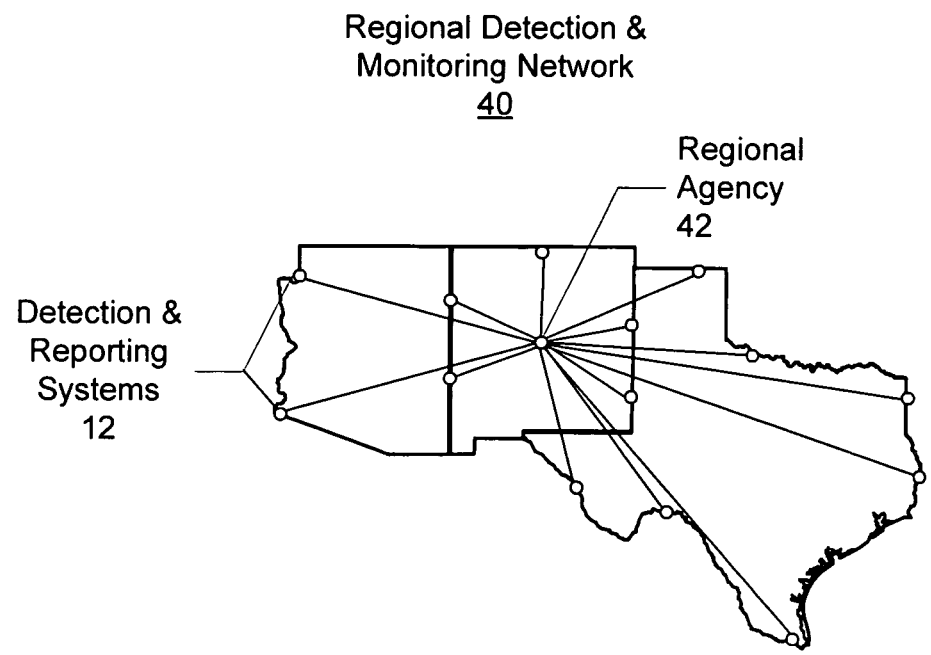
FIGS. 2 and 3 are diagrams illustrating regional and federal detection and monitoring network, respectively.
Figure 3:
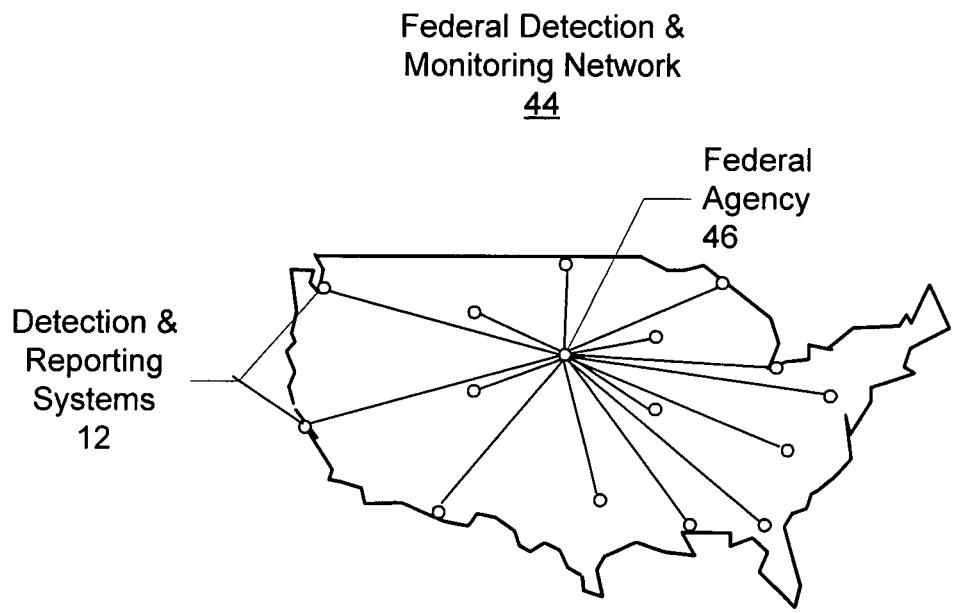

FIG. 2 is a diagram illustrating a regional detection and monitoring network, and FIG. 3 is a diagram illustrating a federal detection and monitoring network. In the regional detection and monitoring network 40 shown in FIG. 2, the port-of-entry detection and monitoring systems 12 in those states report to a regional agency 42. In the federal detection and monitoring network 44 shown in FIG. 3, the port-of-entry detection and monitoring systems 12 are located at state and federal borders and report to a federal agency 46, such as the Department of Homeland Security and the Environmental Protection Agency.

Figure 4:
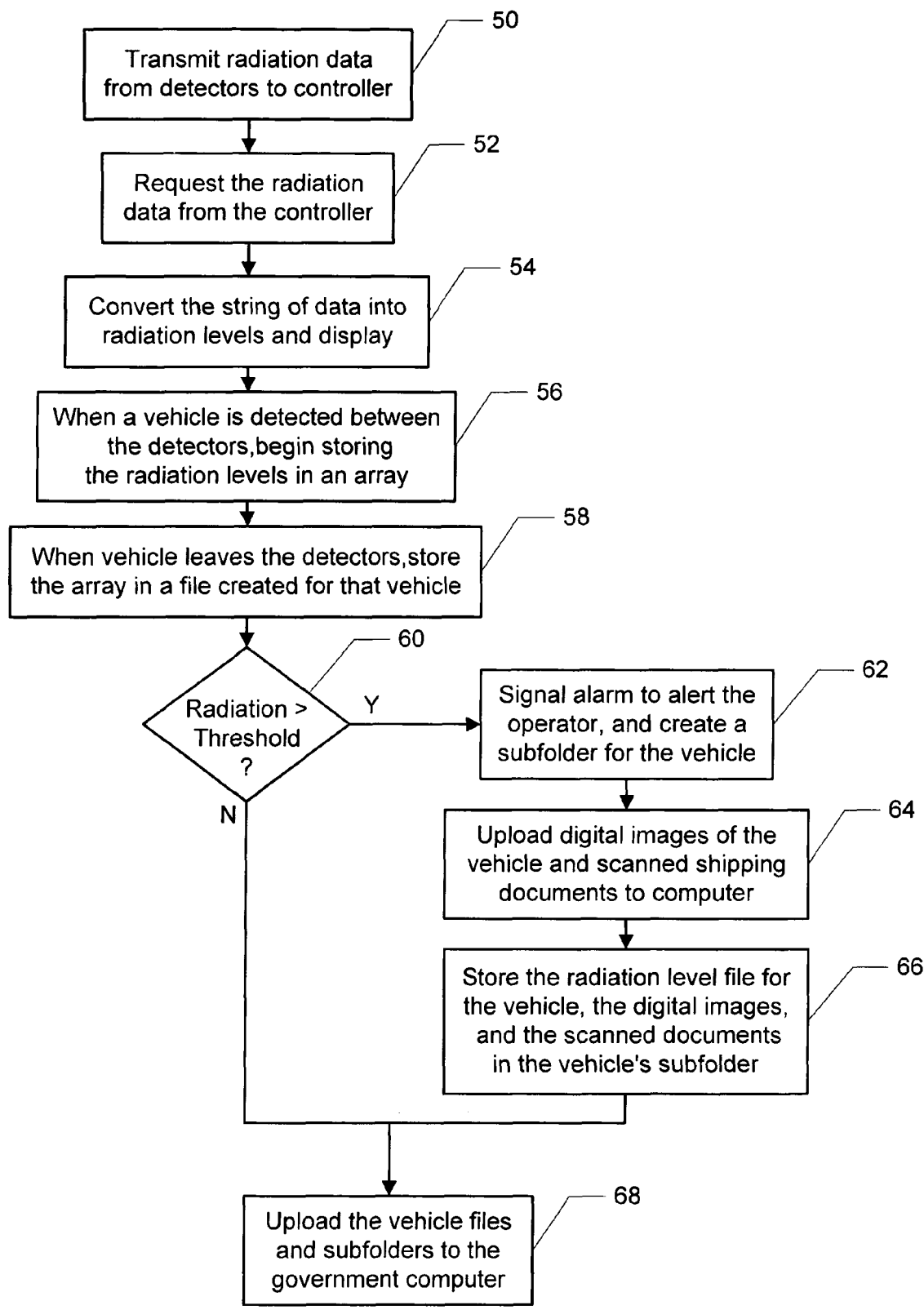
FIG. 4 is a flow chart illustrating a method for detecting and monitoring noncompliant interstate transportation of radioactive materials.

FIG. 4 is a flow chart illustrating a method for detecting and monitoring noncompliant transportation of noncompliant materials in accordance with the present invention. In a preferred embodiment, the process begins once the detectors 14a begin transmitting data to controller 14b in step 50, such as radiation data. More specifically, there are preferably photoelectric sensors in the detector assembly towers that detect the presence of a vehicle between the detectors and activate the detectors. With commercial detection systems 14, the detectors typically transmit data on a continual basis to the controller 14b, and the controller 14b filters background radiation. The software application 24 periodically requests the data from the controller 14 (e.g., 1/sec.) and receives the data as a string of characters in step 52. In the case of radiation datat, the software application 24 converts the string into radiation levels and displays the levels on the computer 16 for an operator in step 54.

When a vehicle is detected between the detector assemblies 14a, the software application 24 begins storing the radiation levels in an array in step 56. Once the vehicle leaves the detection assemblies 14a, the application 24 associates the measured radiation levels with the vehicle by storing the array in a file created for the vehicle in step 58. In a preferred embodiment, the file is identified by a vehicle number that is assigned to each vehicle that passes through the detector units, and the data is displayed on the port of entry computer.

It is then determined if the detected levels of radiation exceed a predetermined threshold (e.g., >0.10 mR/hr) in step 60. This may be done by comparing a geometric mean of the detectors 14a and a calculation of the vehicle surface reading with a predetermined threshold. If the radiation levels exceed the threshold, then an alarm is signaled to alert the operator and the application 24 creates a subfolder for the vehicle for storing pictures from the digital camera 18 and images from scanner in step 62. Thereafter, pictures of the identification markings on the vehicle taken by the digital camera 18 and scanned copies of the vehicle's shipping documents created by the scanner 20 are uploaded to the computer 16 in step 64.

In one preferred embodiment, the picture taking and scanning is performed manually by an operator. If the vehicle is a truck or car, the vehicle can be instructed to pull to the side of the road for this process. However, in another preferred embodiment, the digital camera 18 may be integrated with the port-of-entry computer 16 for automatic picture taking. The radiation level file for the vehicle, the images of the vehicle, and the scanned shipping documents are stored in the vehicle's subfolder in step 66. The vehicle files and subfolders are then uploaded to the government agency computer 22 in step 68 either on a batch or individual basis. In the case of an alarm, the vehicle's subfolder may be uploaded immediately. Steps 66 and 68 may be performed manually by the operator or automatically by the software application 24.

If the port-of-entry computer 16 and the government agency computer 22 are connected via a modem, then the upload process may be made more secure by requiring that the port-of-entry computer 16 first dial the government agency computer 22 and after communication is made, hangs up. In response, the government agency computer 22 then calls back the port-of-entry computer 16. Once a connection is made, the government agency computer 22 appears as a disk drive on the port-of-entry computer 16, and the operator of the port-of-entry computer 16 may drag and drop selected files and folders to the government agency computer 22.

If the port-of-entry computer 16 and the government agency computer 22 are connected via a secure connection or via the Internet, then the files may be uploaded from the port-of-entry computer 16 automatically and stored in a database on the government agency computer 22. In addition, an encryption protocol can be used to protect the file transfers and deter hackers.

In a preferred embodiment, the language chosen for the software application 24 is a product of National Instruments called LabVIEW. It was chosen for its ease in communication with instrumentation, for its cross platform capability, its superior graphical user interface and for its ability to communicate across the Internet. ASCII was chosen as the data form even though it has a relatively inefficient data packing factor because these files can be read by any word processing software and by any machine. The data files are relatively short, so the poor packing factor is not of much concern. Quarterly Calibration includes checking the detection and monitoring system 12 for proper operation, running a plateau curve and setting power supplies if necessary, and calibrating each detector against a check source of, for example ~5 µCi $^{137}$Cs.

Figure 5:
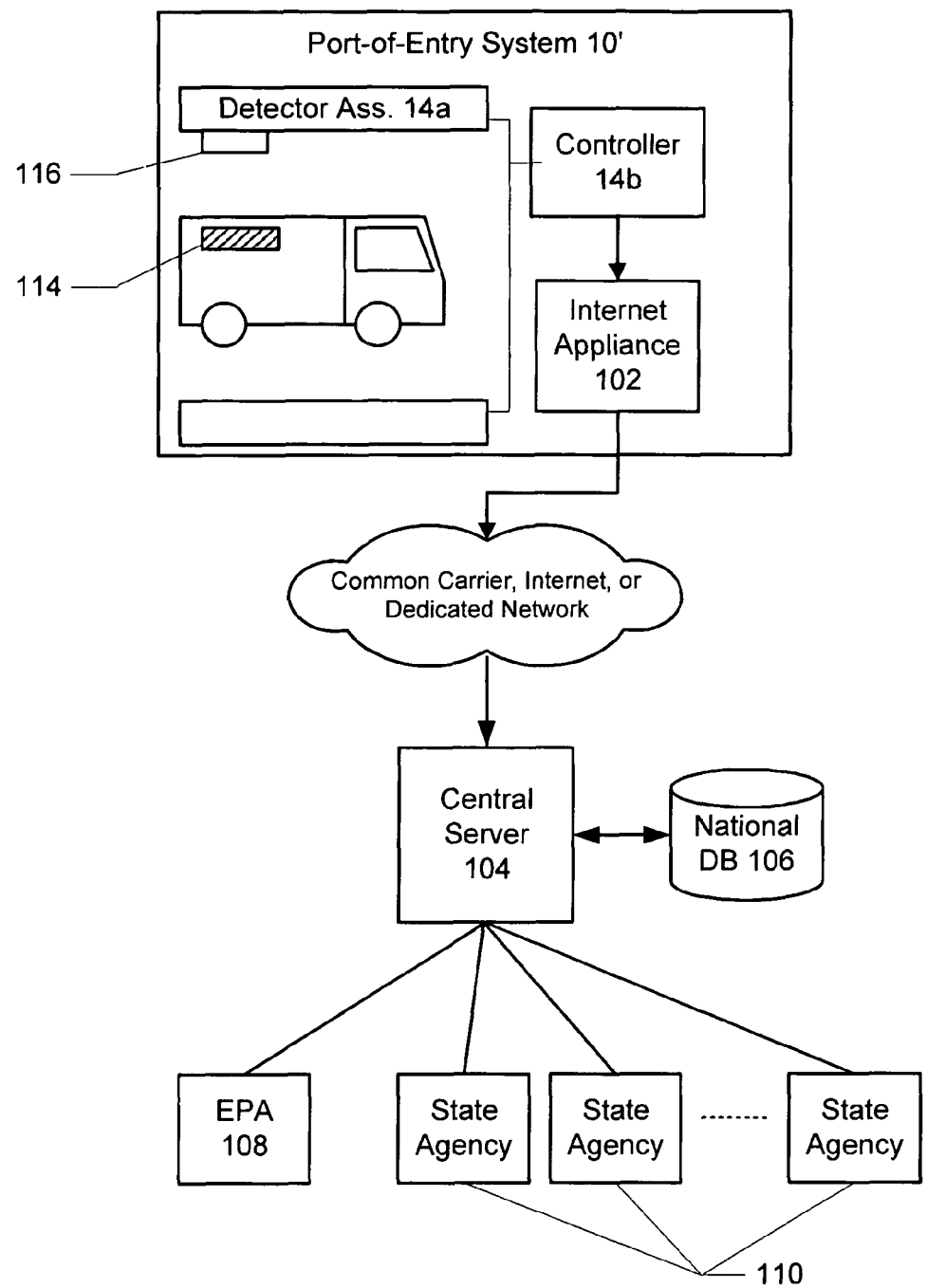
FIG. 5 is a block diagram illustrating a detection and monitoring network in accordance with a second embodiment of the present invention.

FIG. 5 is a block diagram illustrating a detection and monitoring network in accordance with a second embodiment of the present invention, where like components from FIG. 1 have like reference numerals. The second embodiment provides a server-based detector and monitoring network 100, where all port-of-entry systems 10' include an internet appliance 102 or modem that is connected to a central server 104 via a common carrier, the Internet or dedicated network. The central server 104 maintains a national database 106 for vehicles, which is indexed on a unique vehicle identification number. The central server 104 is also accessible by federal agencies such as the Department of Homeland Security and the Environmental Protection Agency 108, as well as state and/or private agencies 110.

The second embodiment of the present invention assumes the existence of a federal regulation that requires all cars and trucks to bear an identification mark, such as a bar-code 114, containing a unique vehicle identification number. Assuming that the law requires the bar-code 114 be placed on cars and trucks in standard positions, the detection assemblies 14a at each port-of-entry could be provided with bar-code scanners 116. This monitoring system could include a tracking system using transponders tracked by satellite similar to those on Waste Isolation Pilot Project (WIPP) transportation vehicles or those used by the ONSTAR™ tracking system.

In operation, as each vehicle passes the detection assemblies 14a, the bar-code 114 is scanned for the identification number (and any optional shipping information). The Internet appliance 102 then saves the vehicle's detector readings in a file named after the identification number, and uploads the file to the server 104. Alternatively, the vehicle identification number may be saved in the file itself. Once uploaded to the server 104, the detector readings in the file are stored in the national database 106 under the vehicle's record.

When a vehicle triggers an alarm, the server 104 may automatically notify the Department of Homeland Security 108 for the appropriate action. In addition, the database 106 is accessible by the state agencies 110 for queries.

According to the present invention, the detection and monitoring systems of the present invention allow the federal government to monitor shipments across the country. For example, if a vehicle enters a state and passes through a port-of-entry for that state without causing an alarm, but then enters the adjoining state and triggers an alarm, either the government agency computer 22 or the national database 106 can be accessed to determine that the vehicle must have picked up the noncompliant load in the first state. The proper authorities can then be dispatched to investigate the source of the contaminant.

The second aspect of the present invention recognizes that not all vehicles entering a state or nation may pass through an official port of entry. One reason is that people who are intent on transporting noncompliant materials into a state or nation will purposefully try to avoid ports of entry equipped with the detection systems described above. Another reason is that terrorist often target locations and events in which a significant number of people are in attendance, such as at malls, concerts, conventions, and sporting events, and a terrorist driving a car bomb, for example, may not need to pass through a port of entry to reach the target.

The second aspect of the present invention overcomes these problems by providing an Integrated Detection and Monitoring System (IDMS) that is both mobile and/or covert. The Mobile/Covert IDMS comprises one or more vehicles that conceal and transport a corresponding detector, and a remote computer/server of a government or private agency to which the results of the dector scans are reported. The vehicle or vehicles in the IDMS system are positioned along side a vehicle pass-through at a security check point to detect levels of materials in vehicles that pass by. The detected levels of materials may then be wirelessly transmitted to the computer/ server of the appropriate agency or command center for review and monitoring. The IDMS thus provides a concealed portable system that can be quickly moved to any designated security checkpoint for covert detection and monitoring, rather than being a conspicuous stationary facility at an official port of entry. Multiple IDMSs may report results back to the computer/server to provide an effective networked system capable of tracking each vehicle's progress throughout the monitored area.

Figure 6:
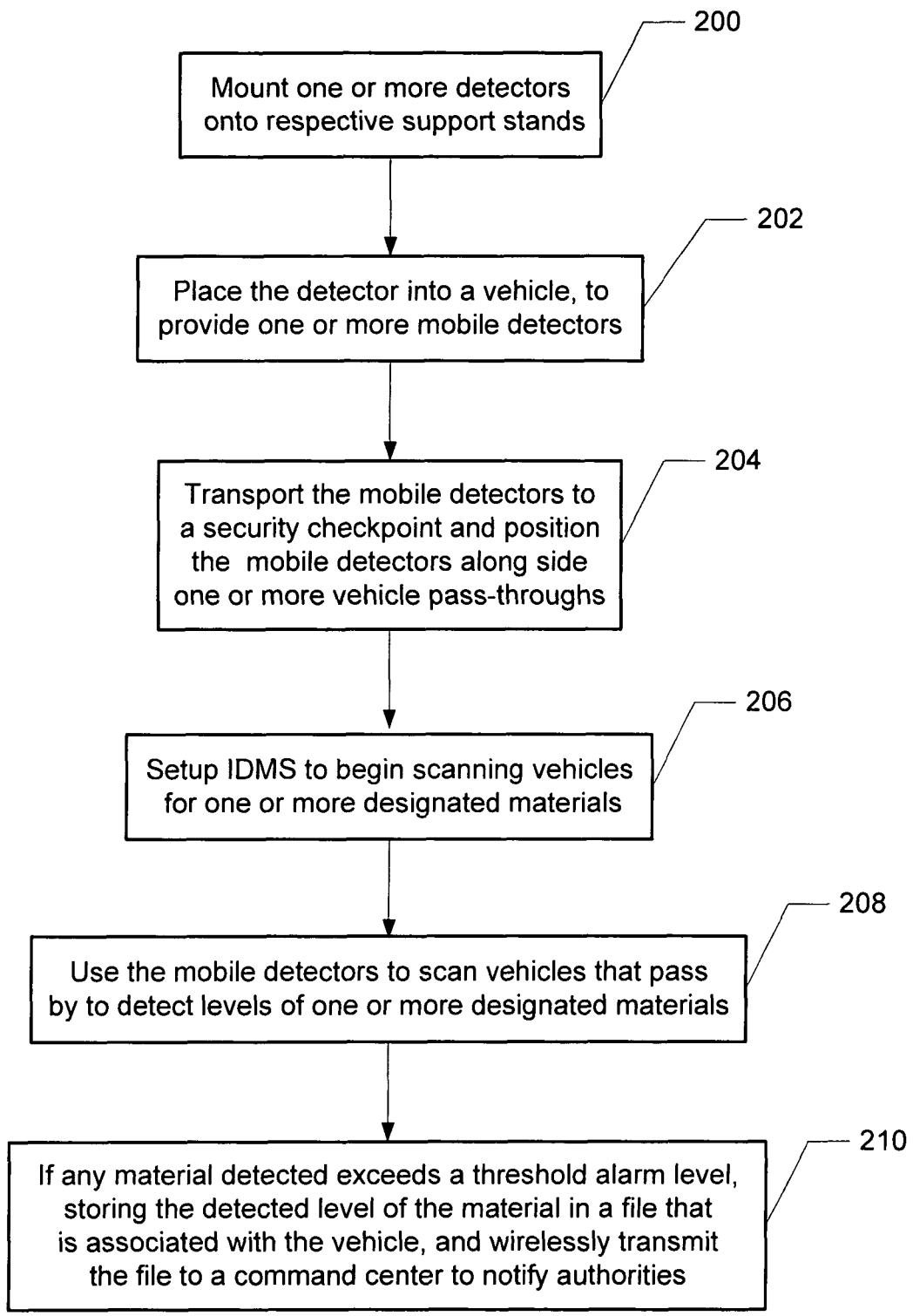
FIG. 6 is a flow diagram illustrating the process for implementing an integrated detection and monitoring system (IDMS) in accordance with a second aspect of the present invention.

FIG. 6 is a flow diagram illustrating the process for implementing an integrated detection and monitoring system (IDMS) in accordance with a preferred embodiment of the present invention. The process begins in step 200 by obtaining a detection system comprising a microprocessor controller and one or more detectors capable of detecting materials (e.g. nuclear, radioactive, explosives, drugs, chemicals, and/or biological agents, etc.), and mounting the detectors onto respective customized support stands. Depending on the type of detection system, the detection system may not include an external controller.

In a preferred embodiment, the detectors may be obtained from a commercial system, such as the Safety-Guard System Series II gamma and neutron detectors by Thermo Electron Corp. of Santa Fe, N. Mex. The detectors may be sensitive to both gamma and neutron radiation. The gamma detectors are presently capable of detecting 0.5 µCi $^{137}$Cs at 5 feet with a confidence level of 90%, with a 3 second response time and a 0.1% false alarm rate. Each gamma detector comprises two polyvinyl toluene (PVT) scintillators approximately 1500 cubic inches. This material is surrounded by reflective material to maximize the collection efficiency of the imbedded photomultiplier tubes (PMTs). Each PMT is supported by a microprocessor controlled power supply and amplifier/discriminator/signal processor. Each microprocessor sends the count rate back to the central controller.

In an alternative embodiment, detectors may be used that comprise the Gamma detectors described above along with four neutron detectors. The neutron detectors may be 5 cm diameter by 80 cm long and filled with $^3$He at 3 atmospheres. Each detector may have a sensitivity of 170 cps/n/sec/cm$^2$. In line with the performance target of significantly reducing nuisance alarm rates, these Gamma detectors incorporate better detector materials, improved electronics, and enhanced algorithms to differentiate between nuclides of concern and any naturally occurring radioactive materials (NORM). Such detector systems are commercially available.

After the detector is mounted onto the support stand, in step 202 the support stand is mounted into a vehicle, thereby providing a mobile detector. The support stands may be customized for the type of vehicle selected to house the detectors. The vehicles used to transport the detectors may be powered or nonpowered vehicles. To provide a covert system, the type of vehicle 236 chosen to house and transport the detectors 232 should be both non-conspicuous and should have sides that effectively conceal the presence of the detector 232, but not block the detection function, such as aluminum. For further concealment, one or both of the mobile detectors 230 may be camouflaged in some fashion. In an alternative embodiment, the detector 232 may be removed from its vehicle, placed along one side of the vehicle pass through, and then camouflaged.

Figure 7:
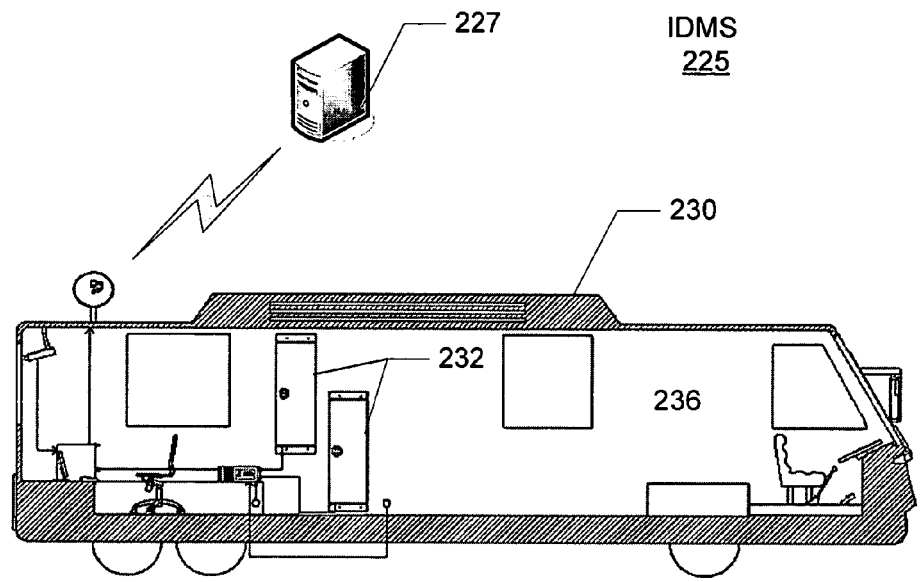
FIGS. 7 and 8 are sectional diagrams illustrating various embodiments for a mobile detector.
Figure 8:
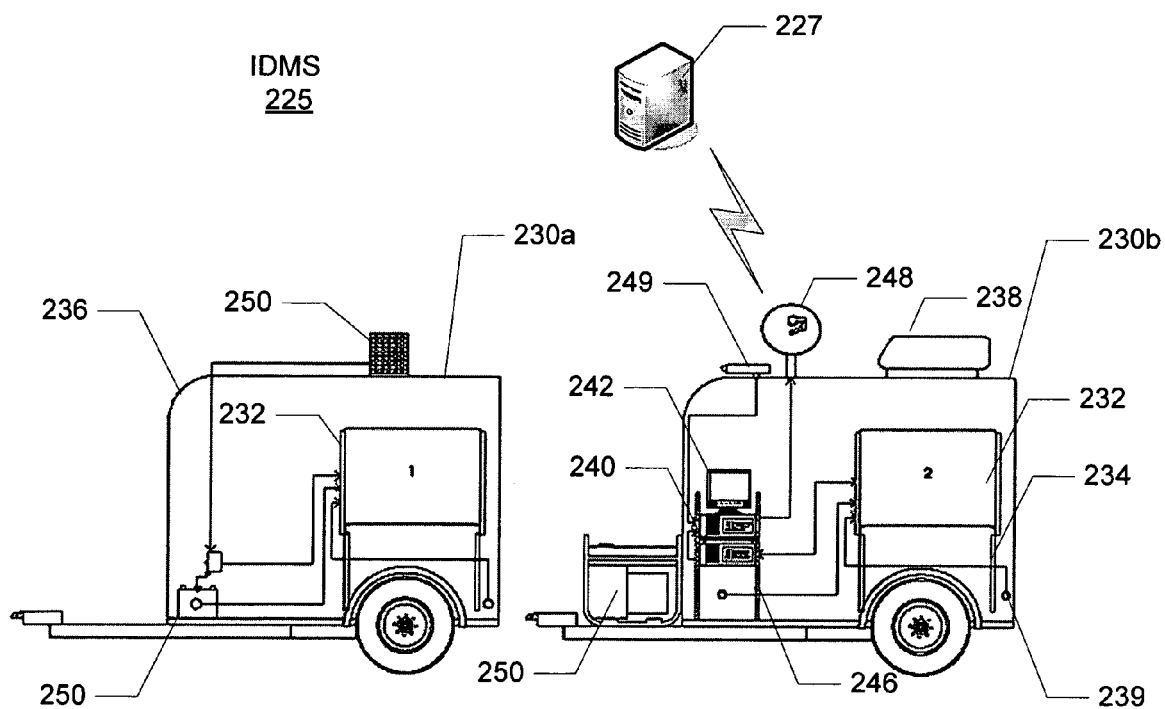

FIGS. 7 and 8 are sectional diagrams illustrating various embodiments for a mobile detector. FIG. 7 shows an embodiment where the IDMS 225 includes a remote command center computer 227, and a single mobile detector 230 in communication with the remote command center computer 227. In the example shown, the vehicle 236 chosen to transport at least one detector 232 is a recreational vehicle. Other powered vehicles may also be used, such as vans, SUVs, and trucks, for instance. Although only one mobile detector 230 may be required for certain applications, in one preferred embodiment, the IDMS 225 includes a pair of mobile detectors to increase sensitivity and improve calibration limits.

FIG. 8 shows an embodiment where the IDMS 225, which includes a set of mobile detectors 230a and 230b (collectively 230), where the vehicles 236 chosen to house the detectors 232 are non-powered, such as trailers, to reduce cost and maintenance. In the embodiment where there are more than one mobile detector 230, one of the mobile detectors 230b may be designated as a command mobile detector, which communicates with the remote command center computer 227. The command mobile detector 230b is also the one used in a single vehicle configuration.

Referring to FIG. 8, each of the mobile detectors 230 in a multi unit IDMS 225 minimally includes a detector 232 mounted upright on a customized support stand 234, and a power source 250 for supplying power to the electronics within. The support stand 234 and detector 232 are preferably slid into the back of the vehicle 236 using a fork lift (not shown). Or if mounted permanently in vehicle 236, the detector 232 may be slid out of the vehicle 236 on an attached rack mounted to the support stand 234.

In a preferred embodiment, the command mobile detector 230b also includes a set of vehicle sensors 239 for lining up the detectors 232 once deployed in the field and for detecting approaching vehicles, a controller 240 and computer 242 (both of which are preferably housed in an electronics rack 246), a communications link 248 for communicating with the command center computer, a digital video camera 249, and due to the presence of electronics, the vehicle 236 should also include an appropriate environmental control unit 238 for protection.

The controller 240 is coupled to each of the detectors 232, and the computer 242 is coupled to the controller 244. Both the controller 240 and the computer 242 running the software application (not shown) function as described above for extracting the stream of detector data from the controller 240.

The communications link 248 is coupled to the computer for transmitting the detected data and vehicle information to a governmental or private command agency computer 227 for monitoring and review. In a preferred embodiment, the communication link 248 comprises an encrypted satellite communication link, however, any other wireless, or wired communications link may also be used. In addition, the communication link 248 may be located remote from the mobile detector 230.

The digital camera 249 is coupled to the computer 242 and is preferably a combination video and still camera that continuously captures video of a vehicle as it passes by the vehicle sensors 239, and optionally captures a high resolution digital still image of the vehicle's license plate if a high level alarm is triggered.

The power source 250, which powers the controller 240, the computer 242, the communications link 248, and the digital camera 249, preferably comprises an electric generator, but may comprise a battery and/or solar power source.

Referring again to FIG. 6, after the mobile detector 230 has been fabricated, in step 204 the mobile detector 230 is transported to a security checkpoint and positioned along side a vehicle pass-through for use as an anti-terrorism technology and/or as a regulatory enforcement mechanism for shipments. One or more of the IDMS 225 can be configured to be deployed overtly or covertly at security checkpoints including but not limited to monitoring roads, shipping port containers, train depots, and ingress and egress points for facilities, such as airports, military bases, national laboratories, and high target events such as political conventions, celebrations like Inauguration, and sporting events etc. Preferably, the security checkpoint is one that requires vehicles to pass by slowly, e.g., less than 7 mph. As sensor technology improves, the IDMS 225 may be deployed along vehicle pass-throughs in which vehicles are traveling at increasingly higher speeds.

Figure 9:
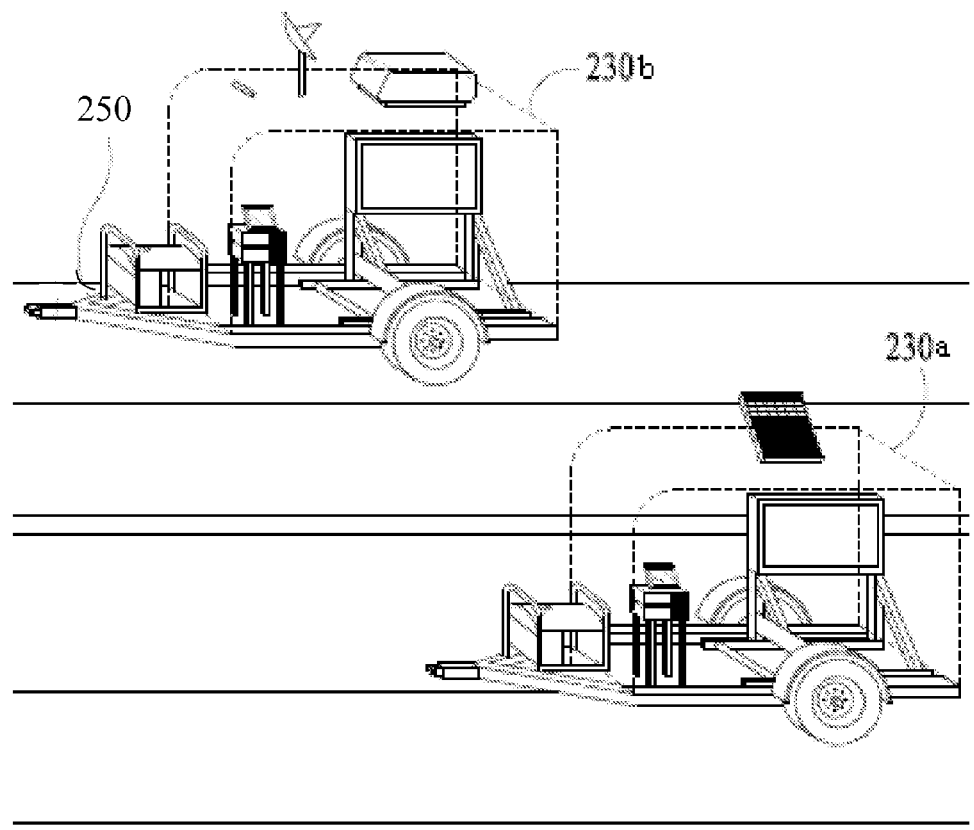
FIG. 9 is a diagram illustrating a two vehicle IDMS setup at a security checkpoint.

FIG. 9 is a diagram illustrating a two vehicle IDMS 225 setup at a security checkpoint. The sides of the trailers are show semitransparent to show the components of the system. In a preferred embodiment, the controller 242 in the command mobile detector 230$b$ is coupled to the detector 232 in the other mobile detector 230$a$ via wireless communications. In this specific example, the command mobile detector 230$b$ utilizes a generator as its power source 250, while the other mobile detector uses solar power and a battery, as it only needs to power the detector and environmental unit, as shown in FIG. 8.

Referring again to FIG. 6, after deployment, the IDMS 225 in step 206 is set up to begin scanning vehicles for one or more designated materials. Each IDMS 225 must be set up at each checkpoint prior to use. The IDMS 225 setup includes the following steps. First, the mobile detector 230 must be positioned along side of a vehicle pass-through. If there are two mobile detectors 230, then they must be positioned on each side of the vehicle pass-through and aligned with one another within a predetermined threshold using vehicle sensors 239, which communicate directly to the detectors 32 and a controller 240.

After the detectors 232 are positioned, a background count rate from the detectors 232 is established and a test is run to establish the variance in the measured signal from the detectors 232. A first alarm level is then set in the software application 24 above the background by a margin six times the standard deviation established by this test. This assures that the probability of a false alarm is minute. When no vehicles are present between the detectors, the system continually updates the background, and modifies the alarm level to maintain this margin, even though the background level may vary by a significant amount. A second alarm level, designated a priority alarm, is established at ten times the original margin. After the detectors are calibrated a third, high level alarm is established, corresponding to count rate equivalent to a maximum reading of approximately 0.10 mR/hr at 1 meter from the surface of a standard 8 foot wide truck. In the preferred embodiment where the detectors 232 scan for radiation, the IDMS 225 may alarm at a confidence level of >99% to a 5 µCi $^{137}$Cs source passing by the detector at 1 meter at 7 mph with a false alarm rate of less than 1 in 10,000.

In step 208, the IDMS 225 is activated and begins scanning vehicles that pass by the mobile detector(s) 225 to detect levels of one or more designated materials, such as radiation, etc. In a preferred embodiment, scanning begins as soon as a vehicle is detected passing by the vehicle sensors 239. As described above with respect to the first embodiment of the present invention, a scan of the levels of the material detected by the sensors 232 are passed to the computer 242 via the controller 240 and displayed on the user interface of the software 24.

In step 210, if any material detected exceeds the first threshold alarm level, the level and location of the detected material are stored on the computer 242 in a file that is associated with the vehicle, and the detected level of the material is wirelessly transmitted to a command center computer to notify the appropriate local, state and/or federal authorities. In response to a high level alarm (e.g., >10 mR/hr), the software application 24 may generate a folder to store the file of the detected levels of the material and digital video and/or pictures of the vehicle. After central command officials assess the information transmitted from the IDMS 225, they may provide additional instructions to the IDMS or other local personnel on how to proceed. The software application 24 may optionally prompt any personnel manning the IDMS 225 to conduct a vehicle safety inspection to determine compliance with regulations and upload scanned shipping documents and any other pertinent data.

In an alternative embodiment, such as where the IDMS 225 is unmanned, the information transmitted to the command center computer could include only the digital images of the vehicle. Other information transmitted could optionally include the location of the IDMS 225 and the direction of travel of the vehicle, which the command center may pass to local police to aid in pursuit and apprehension of the vehicle. The location of the IDMS 225 may be either entered by an operator of the computer to 42 at setup, or automatically determined by equipping the IDMS 225 with a GPS unit that interfaces with the software 24. The direction of travel of the vehicle can be determined based on monitoring the order that the vehicle passes by the vehicle sensors 239.

In the configuration where multiple IDMSs 225 are networked to the command center computer, a vehicle tracking system may be implemented that assists in identifying the location at which noncompliant materials were introduced into the transportation system. For example, a truck entering Colorado without an alarm for noncompliant materials that then enters New Mexico and alarms at a port of entry or other checkpoint indicates that federal, state and local officials should concentrate their investigation in Colorado.

Those with ordinary skill in the art will readily recognize the IDMS 225 of the present invention could be implemented with variations to the embodiments described, and any variations would be within the spirit and scope of the present invention. For example, in one alternative, the mobile detectors may be manned or unmanned, and the computer 242 in the command mobile detector 230$b$ could be removed and located elsewhere. For example, the computer 224 running the software may be located in another nearby vehicle to provide a mobile command center, and/or the computer 224 may be implemented as laptop with wireless or satellite Internet connections.

Some alternative embodiments may include transport considerations. For example to ensure a smooth ride, the mobile detectors 230 may be provided with adequate suspension to assure safe transport of the electronics (e.g., a Torflex axle system). Other alternative embodiments may include security considerations to prevent tampering of the mobile detectors 230, especially for an unmanned IDMS 225. This may include armored or reinforced construction of the sidewalls and doors for impact protection, wheel locks and/or an anchoring system to ensure that the mobile detectors 230 cannot be towed away, leaving the mobile detectors 230 unmarked, and securing the doors with advanced security such as keypads and/or biometrics.

An IDMS 225 has been described in accordance with a second aspect of the present invention in which one or more detectors are mounted into corresponding non-conspicuous vehicles. The vehicle or vehicles can then be moved to a desired location and positioned along side a vehicle pass through. Once activated, the detector within the vehicle(s) detect levels of a predetermined material or materials in vehicles that pass by. One or more IDMS may then wirelessly transmit data that sounds an alarm to a designated remote computer for monitoring and review.

Embodiments for a detection and monitoring network have been disclosed that protect the public from the transportation of noncompliant and illegal materials within vehicles. The present invention has been described in accordance with the embodiments shown, and one of ordinary skill in the art will readily recognize that there could be variations to the embodiments, and any variations would be within the spirit and scope of the present invention. For example, the present invention has been described in terms of a preferred embodiment that detects radioactive materials. However, the detection and monitoring network can be adapted for detection and monitoring of other potentially harmful materials as new detector technology advances (e.g., biological, chemical, explosive, drugs etc.). Accordingly, many modifications may be made by one of ordinary skill in the art without departing from the spirit and scope of the appended claims.

We claim:

1. A method for implementing an integrated detection and monitoring system, comprising:
   concealing a first detector by placing the first detector into a first trailer to provide a first mobile detector;
   concealing a second detector by placing a second detector into a second trailer to provide a second mobile detector;
   transporting the first and second mobile detectors to a security checkpoint, and positioning the first and second mobile detectors on each side of a road, such that the first and second mobile detectors do not straddle or form an overhang over the road, wherein the first and second mobile detectors are configured to be deployed covertly and non-conspicuously at the security checkpoint for anti-terrorism monitoring the road;
   using the first and second mobile detectors to scan vehicles that pass by to detect levels of one or more designated materials, wherein the vehicles pass by in-between the first and second mobile detectors without entering an internal opening of either one of the first and second mobile detectors,
   if any material detected exceeds a threshold alarm level for one of the vehicles, storing the detected level of the material in a file that is associated with the vehicle, and wirelessly transmitting the file to a command center to notify authorities.

2. The method of claim 1 further including: utilizing first and second detectors that are capable of detecting a material including at least one of a nuclear/radioactive material, an explosive material, a chemical, a drug, and a biological agent.

3. The method of claim 1 further including: customizing support stands for first and second trailers, and mounting the first and second detectors to the customized support stands.

4. The method of claim 1 further including: associating at least one digital image taken of the vehicle with the vehicle, and transmitting the at least one digital image to the command center.

5. The method of claim 4 further including: passing the levels of the material detected from the first and second detectors to a controller, and from the controller to a computer, and displaying the detected levels on a user interface of the computer.

6. The method of claim 4 further including: also transmitting to the command center a location of the first and second mobile detectors and a direction of travel of the vehicle that caused the alarm.

7. The method of claim 1 further including: setting up the first and second mobile detectors to begin scanning vehicles for one or more designated materials.

8. The method of claim 7 further including: after the first and second detectors are aligned,
   (i) establishing a background count rate from the first and second detectors and performing a test to establish a variance in a measured signal from the detectors;
   (ii) setting first alarm level above the background by a margin of approximately six times the standard deviation established by the test;
   (iii) setting a second alarm level at approximately ten times the original margin; and
   (iv) setting a third, high level alarm, corresponding to count rate equivalent to a maximum reading of at a predetermined distance from a surface of a standard vehicle.

9. The method of claim 1 further including: further providing the first and second mobile detectors with a set of vehicle sensors for lining up the first and second detectors once deployed in the field and for detecting the vehicles that approach, and an environmental control unit.

10. The method of claim 9 further including: further providing the second mobile detector with a controller, computer, a wireless communications link, a digital video and still camera, and a power source.

11. The method of claim 10 further including: wirelessly coupling the controller in the second mobile detector to the first detector in the first mobile detector.

12. The method of claim 10 wherein the digital camera is a combination video and still camera that continuously captures video of the vehicle as it passes by the vehicle sensors, and optionally captures a digital still image of the vehicle's license plate if a high level alarm is triggered.

13. A transportation detection and monitoring network, comprising:
   a central computer;
   a first mobile detector comprising a first trailer concealing a first detector;
   a second mobile detector comprising a second trailer concealing a second detector;
   the first and second mobile detectors positioned on each side of a vehicle pass-through at a security checkpoint in communication with the central computer, such that the first and second mobile detectors do not straddle or form an overhang over the vehicle pass-through, wherein the first and second mobile detectors are configured to be deployed covertly and non-conspicuously at the security checkpoint for anti-terrorism monitoring at least one of roads, shipping containers, train depots, and ingress and/or egress points for facilities;
   wherein the first and second detectors measure are used to scan vehicles that pass by to detect levels of one or more designated materials, wherein the vehicles pass by in-between the first and second mobile detectors without entering an internal opening of either one of the first and second mobile detectors,
   wherein at least one of the first and second mobile detectors further includes,
       a power source for supplying power to the first and second mobile detectors,
       a computer coupled to the first and second detectors, the computer for processing data detected by the first and second mobile detectors for each of the vehicles, such that if any material detected exceeds a threshold alarm level for one of the vehicles, the detected level of the material is stored in a file that is associated with the vehicle, and
       a communications link for transmitting the data from the computer to the central computer for monitoring.

14. The transportation detection and monitoring network of claim 13 wherein the first and second mobile detectors further includes a set of vehicle sensors for detecting approaching vehicles.

15. The transportation detection and monitoring network of claim 14 wherein the first and second mobile detectors further includes an environmental control unit.

16. The transportation detection and monitoring network of claim 15 wherein the communication link comprises a satellite communications link.

17. The transportation detection and monitoring network of claim 15 further including a digital camera for capturing a digital image of each of the vehicle that generates detected levels that exceed a predetermined threshold.

18. The transportation detection and monitoring network of claim 17 wherein the digital camera is coupled to the computer continuously captures video of the vehicle as it passes by the vehicle sensors, and optionally captures a digital still image of the vehicle's license plate if an alarm is triggered.

19. The method of claim 18 wherein the first and second detectors are capable of detecting a material including at least one of a nuclear/radioactive material, an explosive material, a chemical, and a biological agent.

20. The method of claim 19 wherein the first and second detectors are mounted on support stands that have been customized for the first and second trailers.

21. The method of claim 13 wherein at least one of the first and second trailers is camouflaged.

22. The method of claim 21 wherein one of the first and second detectors from at least one of the first and second detectors is removed from a corresponding one of the first and second trailers, placed on one side of the vehicle pass-through, and camouflaged.

23. A method for implementing an integrated detection and monitoring system, comprising:
   placing at least one detector into a vehicle, thereby providing at least one mobile detector;
   transporting the at least one mobile detector to a security checkpoint and positioning the at least one mobile detector along side a vehicle pass-through;
   setting up the at least one mobile detector by,
      aligning the at least one mobile detector,
      establishing a background count rate from the at least one mobile detector and performing a test to establish a variance in a measured signal from the at least one mobile detector,
      setting first alarm level above the background by a margin of approximately six times the standard deviation established by the test,
      setting a second alarm level at approximately ten times the original margin, and
      setting a third, high level alarm, corresponding to count rate equivalent to a maximum reading of at a predetermined distance from a surface of a standard vehicle;
   using the at least one mobile detector to scan vehicles that pass by to detect levels of one or more designated materials; and
   if any material detected exceeds a threshold alarm level, storing the detected level of the material in a file that is associated with that vehicle, and wirelessly transmitting the file to a command center to notify authorities.

24. The method of claim 1 wherein in response to the vehicle passing through a first security checkpoint without exceeding the threshold alarm level, and entering a second security checkpoint and exceeding the threshold alarm level, a determination is made that the vehicle picked up the material between the first security checkpoint and the second security checkpoint.

25. The transportation detection and monitoring network of claim 15 wherein in response to the vehicle passing through a first security checkpoint without exceeding the threshold alarm level, and entering a second security checkpoint and exceeding the threshold alarm level, a determination is made that the vehicle picked up the material between the first security checkpoint and the second security checkpoint.

26. A method for implementing an integrated detection and monitoring system, comprising:
   concealing a first detector by placing the first detector into a first trailer to provide a first mobile detector;
   concealing a second detector by placing a second detector into a second trailer to provide a second mobile detector;
   transporting the first and second mobile detectors to a security checkpoint, and positioning the first and second mobile detectors on each side of a road, such that the first and second mobile detectors do not straddle or form an overhang over the road, wherein the first and second mobile detectors are configured to be deployed covertly and non-conspicuously at the security checkpoint for anti-terrorism monitoring the road;
   using the first and second mobile detectors to scan vehicles that pass by to detect levels of one or more designated materials, wherein the vehicles pass by in-between the first and second mobile detectors without entering an internal opening of either one of the first and second mobile detectors,
   if any material detected exceeds a threshold alarm level for one of the vehicles, storing the detected level of the material in a file in association with the vehicle, and wirelessly transmitting the file to a command center computer to notify authorities, such that in response to the vehicle passing through a first security checkpoint without exceeding the threshold alarm level, and entering a second security checkpoint and exceeding the threshold alarm level, a determination is made that the vehicle picked up the material between the first security checkpoint and the second security checkpoint.

* * * * *